April 28, 1964

R. L. BRIGGS 3,131,325

ARC WELDING SYSTEM

Filed Feb. 17, 1961

INVENTOR.
Rufus L. Briggs
BY
Roberts, Cushman & Grover,
ATT'YS.

April 28, 1964  R. L. BRIGGS  3,131,325
ARC WELDING SYSTEM
Filed Feb. 17, 1961  2 Sheets-Sheet 2

INVENTOR.
Rufus L. Briggs
BY
Roberts, Cushman & Grover,
ATT'YS.

United States Patent Office 3,131,325
Patented Apr. 28, 1964

3,131,325
ARC WELDING SYSTEM
Rufus L. Briggs, Melrose, Mass., assignor to Electrarc, Inc., Boston, Mass., a corporation of Massachusetts
Filed Feb. 17, 1961, Ser. No. 90,127
2 Claims. (Cl. 314—74)

This invention relates to electric arc welding and more particularly to a technique of regulating the width of an arc gap.

It has been demonstrated that for certain kinds of welding such as the welding of relatively thin sheets of metal a pulsed arc has certain advantages, the most important being that the heating is confined to a relatively small area and that fewer impurities from the surrounding atmosphere contaminate the molten metal. Such a system is disclosed in Patent No. 2,235,385 to Alexander Rava, dated March 18, 1941, which describes an energy storage apparatus and control devices for producing such a pulsed arc. In this system, since the arc exists only intermittently, there must be an auxiliary means for ionizing the gases in the arc gap before the arc can be restarted. The device typically employed is a high voltage spark generator of relatively low power timed in synchronization with the main pulsed power source. This device produces a voltage high enough to ionize the gases within a relatively wide gap. Once the ionization has been started the main power source can then produce a high power arc using relatively low voltage. A serious problem associated with the use of such a system is the impossibility of automatically controlling the width of the arc gap by conventional means depending upon measuring the welding current.

The main object of the present invention is to solve the above mentioned problem by providing a simple and reliable means for continuously and automatically adjusting the arc gap in a pulsed arc welding system of the above type, and generally to provide a very accurate means for adjusting the arc gap in any electric arc welding system.

Other objects of the present invention are to provide an arc gap supervisory system which yields both forward and backward adjustment of an electrode, which yields a variable rate adjustment of an arc gap, which is independent of the power of the welding arc, which is substantially unaffected by varying mechanical loads on the gap adjusting mechanism, and which is simple and dependable in operation.

The substance of the invention can be briefly summarized in characteristic aspects thereof as follows.

In its main aspect, the invention contemplates the utilization of a high voltage sensing pulse periodically impressed across the arc gap in addition to the welding current itself, for regulating the welding gap. As the peak voltage, appearing across the gap due to the sensing pulse before ionization occurs, is a function of the width of that gap the present invention contemplates the utilization of that voltage as a sensing mechanism for supervising, regulating, and adjusting the width of the gap.

Although this manner of sensing the width of the arc gap is particularly practical in a pulsed welding system which incorporates an ionizing high voltage source as an integral part of the welding apparatus, that source being utilized for purposes of the invention in addition to its conventional function, the technique according to the invention can also be applied to other forms of electric arc welding whether employing a continuous or an intermittent welding arc, by including a separate high voltage pulse source. This pulse, though not necessary for starting the arc, will produce a signal across the gap which is proportional to the gap width.

In a more specific aspect a capacitor is charged through a resistor or through a rectifier by the high voltage pulse, whether an ionizing pulse or a separate sensing pulse. A servo mechanism connected to this capacitor maintains the voltage across the capacitor at a fixed predetermined value by adjusting the arc gap. In a preferred embodiment the motor which adjusts the welding electrode and thus the gap is provided with pulsating direct current from an alternating current power source by way of thyratron rectifying circuit. The voltage across the sensing capacitor is utilized to regulate the firing time of the thyratron in relation to the phase of the alternating current power source, more power being passed to the motor as the firing time is advanced, whereby the motor normally advances the electrode at a normal rate, but slows it down or speeds it up depending on the sensing voltage as compared to a preset target voltage.

These and other objects and aspects of the substance of the invention will appear from the following detailed description of several practical embodiments thereof illustrating its novel characteristics.

The description refers to drawings in which

FIG. 1 shows an embodiment preferred when electrode burnoff is at a fairly steady rate as in the production welding of continuous seams. The embodiment is applied to a pulsed arc welding system incorporating the above mentioned high voltage ionizing pulses.

Figure 1:
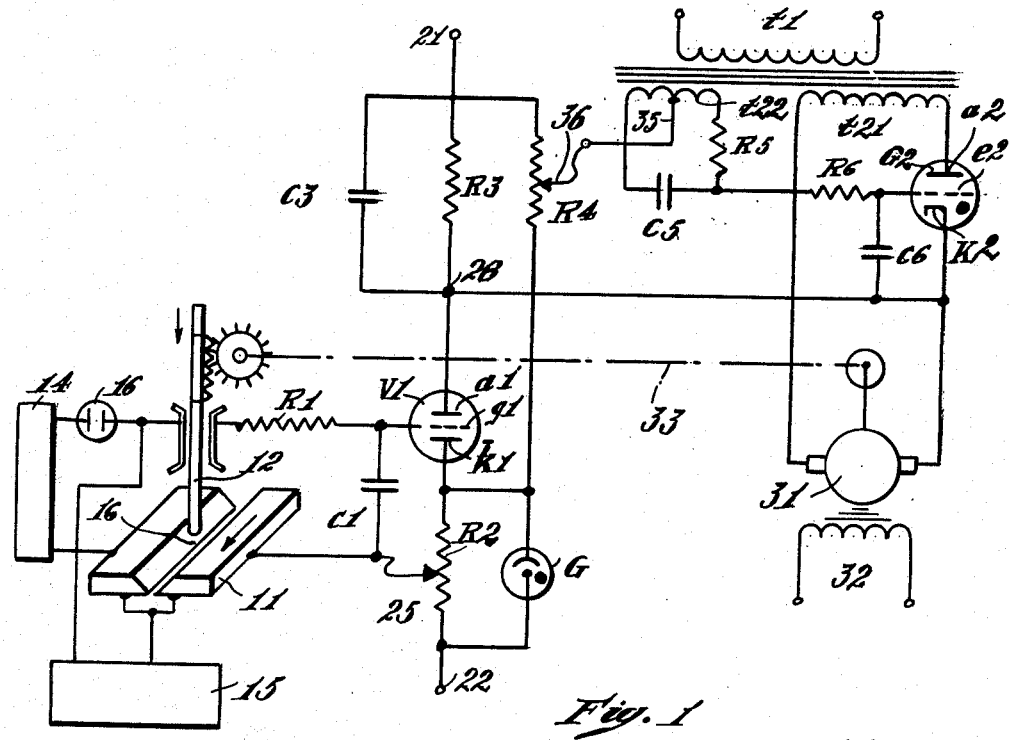
FIG. 1 is a diagrammatical representation of the present invention for adjusting an arc gap.

The work to be welded is indicated at 11 and an electrode at 12. Relative movement of work and electrode is indicated by the arrows applied respectively thereto. A source of stored energy 14 for the welding pulses and a high voltage igniting pulse source 15 are connected in parallel across the arc gap 16. Rectifying means 16 prevents the high voltage igniting pulse from being shunted through the power circuitry 14. A resistor R1 and a sensing capacitor C1 are connected in series across the arc gap. The resistance value of the resistor R1 is appreciably higher than the impedance of the pulse source 15. The junction between R1 and C1 is connected to the grid $g1$ of a vacuum tube V1, connected to a suitable supply voltage source 21, 22. A potentiometer R2 on the cathode $k1$ of the vacuum tube establishes the relative direct current potentials of the vacuum tube and arc circuits and thereby permits preselection of a target voltage for the sensing capacitor C1. A voltage regulator tube G is in conventional manner connected across R2. The anode $k1$ of the tube V1 is connected to a load resistor R3 in parallel with a damping capacitor C3. Paralleling the vacuum tube V1 and its load circuit is a potentiometer R4 which serves to establish the relative direct current potential effective in the regulator circuitry now to be described, in relation to the voltage at the anode $a1$ of the vacuum tube V1.

In the regulator circuit, $t21$ is a secondary winding of a power transformer T. A direct current motor 31 with field winding 32, for advancing the electrode by means schematically indicated at 33, and a thyratron rectifying tube G2 are connected in series across this secondary $t21$. Associated with the control electrode $e2$ of the thyratron G2 is a second secondary winding $t22$ of the transformer T, having across its terminals a resistor R5 and a capacitor C5 in series. The junction between the resistor R5 and the capacitor C5 is connected to the electrode e2 through the resistor R6. A capacitor C6 bridges the grid e2 and the cathode k2.

The center tap 35 of the secondary winding t22 which is associated with the electrode e2 of the thyratron G2 is connected to the tap 36 of the potentiometer R4 in the vacuum tube circuit, while the cathode k2 of the thyratron G2 is connected to the anode a1 of the vacuum tube V1 and to the capacitor C6.

The operation of the circuit is as follows:

Since all other voltages appearing across the arc gap 16 are small in relation to the high voltage igniting pulse, the capacitor C1 will be charged through the resistor R1 to a finite voltage which is a function of the peak voltage appearing across the arc gap. This voltage appearing across the capacitor C1 is balanced by the voltage appearing between the tap 25 of the potentiometer R2 and the cathode k1 of the tube V1. As mentioned above, this potentiometer R2 is adjusted to a target voltage which corresponds to the desired arc gap width. Thus, any deviation of the voltage across the capacitor C1 from the target voltage will appear between the grid g1 and the cathode k1 and be amplified by the vacuum tube V1.

The voltage across the potentiometer R2 is preferably stabilized by the above mentioned voltage regulator tube G so as to eliminate negative feedback caused by the varying current drawn by the tube V1. The necessary load for the vacuum tube V1 is provided by the resistor R3 and the capacitor C3 provides damping so that the circuit will not be disturbed by random, short term electrical variations.

As mentioned above, the direct current motor 31 is arranged to feed the electrode 12 to the arc by means of some suitable linkage 33. Power for this motor comes from the secondary winding t21 of the transformer T, and its field 32 is suitably excited. The alternating current from t21 is rectified into a pulsating direct current usable by the motor 31, by the thyratron G2. An alternating current triggering voltage is applied to the electrode e2 of the thyratron G2 by the second secondary winding t22 of the transformer T. The voltage appearing across the winding t22 is in phase with the voltage supplied to the anode a2 of the thyratron but the phasing network consisting of the resistor R5 and the capacitor C5 effects in well known manner a phase shift of approximately 90 degrees in the voltage finally appearing on the control electrode e2, with respect to the center tap 35 of t22. The resistor R6 limits the current drawn by the electrode e2 when the tube G2 is conducting and the capacitor C6 damps the high frequency oscillations typically associated with the firing of the tubes of this type.

For each point in time of positive half-cycle of the alternating current supply voltage applied to the anode a2 of the thyratron there is a corresponding negative voltage for the control electrode e2 above which the tube will fire. The firing time of the thyratron, in relation to its anode-cathode voltage v, is thus determined by (a) the amplitude of the A.C. component of the triggering voltage, (b) the phase difference between the A.C. component of the triggering voltage and the anode-cathode voltage of the thyratron, and (c) the direct current reference level of the triggering voltage applied to the electrode of the thyratron as related to the direct current potential of its cathode. In the preferred embodiment shown, the control of the firing point and hence of the amount of power going to the electrode feed motor is effected by altering item (3), the direct current reference level of the alternating current triggering voltage.

By virtue of the connection between the center tap 35 of the transformer winding t22 and the tap 36 of the voltage dividing potentiometer R4, and the connection between the anode a1 of the vacuum tube V1 and the cathode k2 of the thyratron G2, the triggering voltage appearing on the control grid e2 of the thyratron G2 with respect to its cathode k2 is the sum of the phase shifted A.C. triggering voltage and the direct current output of the vacuum tube amplifier.

Figure 2:
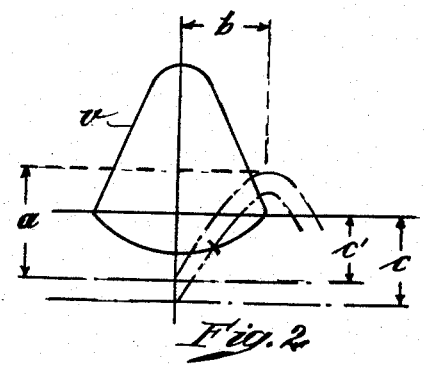
FIG. 2 is a diagram explaining the operation of apparatus according to FIG. 1.

Accordingly, as the voltage across the sensing capacitor C1 increases as compared to the predetermined target voltage set at potentiometer R2, in response to an undesired increase in the width of the arc gap, the amplified direct current voltage change will appear between the grid and cathode of the thyratron 36, decrease the D.C. reference level causing the thyratron to fire earlier and to transmit more power to the electrode feed motor 31 thus driving it faster to correct the detected detrimental condition. This regulation principle is well known and will be understood, without further explanation, from FIG. 2 to which the previously introduced legends are applied, c being for example the normal triggering voltage and c′ a decreased voltage causing the motor to run faster and the electrode to feed faster.

If the electrode burn-off is at a fairly steady rate the potentiometer R2 will be set to yield a steady running of the motor 31 with the arc gap 16 at its proper width, and deviations in the arc gap width will then cause variations in the motor speed about this target speed, as above explained.

Depending upon the parameters of the particular system the response of the circuit can be altered or damped so as to eliminate hunting while achieving the most rapid correction possible.

Figure 3:
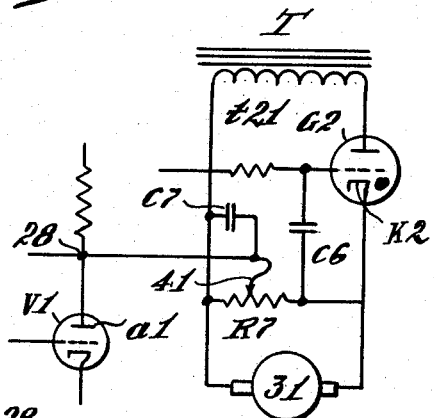
FIG. 3 is a modification of the motor circuitry of the device according to FIG. 1.

A modification which renders the device according to the invention relatively insensitive to variations in the mechanical load on the motor is shown in FIG. 3. In this modification, the connection from the anode a1 of the vacuum tube V1 is made from 28 to the tap 41 of a potentiometer R7 connected across the terminals of the motor 31 instead of directly to the cathode k2 of the thyratron G2 as in FIG. 1. A capacitor C7 is connected between the tap 47 and the free terminal of secondary t21.

The effect of this modification is to introduce into the system a negative feedback voltage which is proportional to the speed of the motor. The motor 31 generates a back E.M.F. which is generally proportional to its speed. This voltage appears across the potentiometer R7 and, depending upon the setting of the tap 41, a portion of this voltage is added to the output voltage of the vacuum tube amplifier and appears between the control electrode and the cathode of the thyratron G2. The capacitor C7 damps the transient voltages due to the pulsating nature of the power supply. The power passed by the thyratron is thus an inverse function of the speed of the motor as well as a direct function of the arc gap width.

Figure 4:
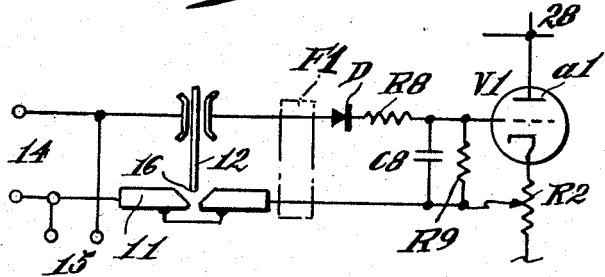
FIG. 4 is a modification of the sensing elements of the device according to FIG. 1.

FIG. 4 illustrates a further modification of the sensing elements, which can be used when an alternating current ionizing pulse is employed for sensing or when it is desired to produce a comparatively high potential across the sensing capacitor C8. In this modification a rectifier D and a capacitor C8 are connected in series across the arc gap 16, and a resistor R9 is connected between grid and cathode of V1. Due to the high voltages involved and the relative low forward resistance of many rectifiers, it will typically be necessary to include a resistor R8 for limiting the charging current going into the capacitor C8. With this arrangement the capacitor C8 will tend to be charged to a voltage which is a function of the peak voltage appearing across the welding gap regardless of the particular value of the low voltage that exists between peaks. As distinguished therefrom, in the circuit according to FIG. 1 without rectifying component, the capacitor C1 charges to a voltage which is a function of the average voltage although for the particular case where high voltage pulses of short duration are applied it is also a function of the peak voltage.

The voltage appearing across the capacitor C8 is amplified at V1 and used to control a motor as in the circuit of FIG. 1. The grid leak resistor R9 is provided to allow the system to follow changes in gap width which produce a falling peak level.

Figure 5:
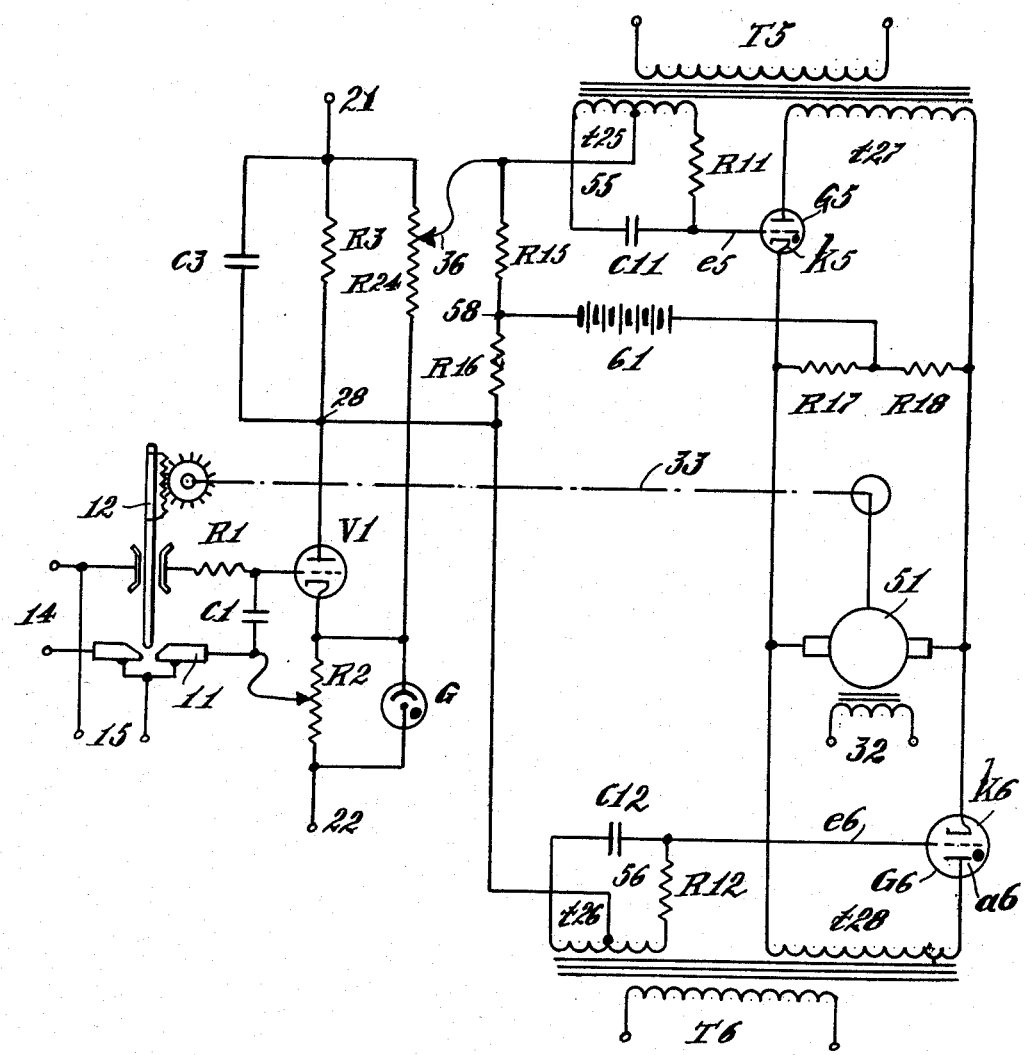
FIG. 5 illustrates another embodiment of the invention.

FIG. 5 illustrates a device quite analogous to that described with reference to FIG. 1 but arranged so as to permit control of the arc gap in systems wherein both forward and backward adjustment of the arc gap may be required as where welding is performed intermittently.

In the embodiment according to FIG. 5 a reversible D.C. motor 51 is supplied with pulsating direct current by either of two sets, each having a separate A.C. power source such as transformers T5 and T6 and thyratron rectifiers G5, G6, respectively. These power supply sets are arranged so that the plate of the thyratron of each set receives current 180° out of phase with that received by the other thyratron and also so that each power supply set tends to drive the motor 51 in the opposite direction from the other. Each thyratron also has associated with its grid an independent source of A.C. triggering voltage which is shifted in phase with respect to the voltage appearing on the plate of the respective thyratron. These triggering voltage sources 55, 56 respectively, are similar to that described with reference to components R5, C5 of FIG. 1. They comprise secondaries t25, t26 of transformers T5, T6 respectively, capacitors C11, C12 and resistors R11, R12, respectively.

The sensing capacitor C1 and its charging resistor R1 are arranged as in FIG. 1 in the control circuit of the vacuum tube V1. Here, however, the output energy of the vacuum tube amplifier is split into two equal components by the resistors R15 and R16. The direct current reference level of the motor 51 and of the cathodes $k5$, $k6$ of the thyratrons G5, G6 is determined by the midpoint 58 of the output load R15, R16 and by a fixed bias source indicated as battery 61, connected between resistors R17, R18. These resistors perform the mechanical feedback function as explained above with reference to the potentiometer R7 of FIG. 3. The potentiometer R24, corresponding to R4 of FIG. 1, is adjusted so that voltage across the resistors R15 and R16 is zero when the arc gap has the desired spacing. Thus any departure from the desired spacing will cause the D.C. reference level of the grid of one thyratron to become more positive with respect to its cathode and the grid of the other to become more negative.

With the arc gap at its proper spacing the normal bias voltage on the grids $e5$, and $e6$ of the thyratrons G5 and G6, provided by the battery 61 is sufficient to prevent these tubes from firing, the motor 51 receives no power, and the electrode 12 remains stationary. If the arc gap is not correct in certain sense a voltage is developed across the resistors R15 and R16. This causes the grid of one thyratron to become more positive with respect to its cathode and the grid of the other to become more negative. With the D.C. reference level of its grid thus raised, the one thyratron will be triggered by its source of A.C. voltage, transmitting power to the motor 51. The other tube will remain cut off.

If the arc gap is incorrect in the opposite sense, the voltage developed across the resistors R15 and R16 will also be of an opposite sense and the thyratron which, in the previous case was permitted to fire, will remain cut off and the thyratron which was previously cut off will fire causing the motor 51 to turn in the opposite direction, thus again tending to correct the error in arc gap spacing.

Because, as pointed out above, the phase of the triggering voltage is shifted with respect to the voltage applied to the plate of each tube, the amount of power passing to the motor again depends upon the magnitude of the change in the direct current reference level of the alternating current triggering voltage at the control electrode of the thyratron. Thus, this embodiment will accomplish a continuous variable rate adjustment control of the arc gap including both advancing and withdrawing the electrode, as compared with the adjustable rate advancement only carried out by the embodiment according to FIG. 1.

While the present invention has been illustrated above as applied to pulsed arc welding systems, the same general arrangement can profitably be used with more conventional welding apparatus by including a high voltage pulse source.

For example, it has been found for continuous arcs that pulses from a source capable of pulses of approximately 100,000 volts will charge the sensing capacitor to potentials of approximately 100 volts and that this signal voltage is for practical purposes independent of the power of the continuous arc though it remains sensitive to the width of the arc gap.

It has also been found, when using such continuous arcs and also when the frequency of the sensing pulse is different from that of the power pulse, that it is sometimes advantageous to use a discriminatory network between the arc and the voltage amplifier for rejecting the voltages resulting from the power source and passing only the desired voltages of the superimposed sensing pulse. Such a network is shown as F1 in dot and dash lines in FIG. 4 as an alternative. The circuitry and component values of these filters or networks will vary, in a manner familiar to those skilled in the art, depending on the frequency (if any) of the power source and the frequency of the sensing pulse.

It should be understood that the present disclosure is for the purpose of illustration only and that this invention includes all modifications and equivalents which fall within the scope of the appended claims.

I claim:

1. In pulsed electric arc welding apparatus having an adjustable electrode wherein each welding pulse is initiated by a high voltage igniting pulse, a device for controlling the width of an arc gap by adjusting the electrode, comprising: means for detecting the peak voltage of said igniting pulse including a capacitor charged by said igniting pulse, and means for amplifying the voltage appearing across said capacitor; an alternating current source; a direct current motor; a rectifier having firing control means, for supplying current from said alternating current source to said direct current motor; a source of triggering voltage for said rectifier of the same frequency as said alternating current source; means for delaying the phase of said triggering voltage relatively to said alternating current source; regulating means responsive to the output voltage of said amplifying means for altering the direct current reference level of said alternating current voltage thereby to vary the direct current power passed by said rectifier; and means associated with said electric motor for advancing said electrode at a speed determined by the power received by said motor.

2. In pulsed electric arc welding apparatus, a device for controlling the width of an arc gap, comprising: a resistor and a capacitor in series across said gap; a reversible direct current electric motor; a first thyratron; a first independent source of alternating current power; means for connecting one side of said first source to the anode of said first thyratron and on the other side to one armature terminal of said motor; a second thyratron; a second independent source of alternating current power; means for connecting one side of said second source to the anode of said second thyratron and on the other side to the other armature terminal; said sources applying through said connecting means to the two thyratrons voltages approximately at opposite phase with the pulsating direct current from the first source and first thyratron, and the pulsating direct current from the second source and second thyratron, respectively, tending to drive said motor in opposite directions; means for applying an alternating current triggering voltage to the control electrode of each thyratron, the phase of said triggering voltage lagging approximately 90° behind the respective anode voltage; means for normally providing a direct current bias on the control electrode of each thyratron such that said triggering voltages are blocked from firing either of said thyratrons; means interposed between each control electrode and said bias means and responsive to the voltage appearing across said capacitor, for altering the normal direct current potential of said control electrodes so as to permit the triggering voltages to fire said thyratrons, the first thyratron being allowed to fire as the voltage across said capacitor increases, and the second thyratron being allowed to fire as the voltage across said capacitor decreases; and means cooperating with said motor for increasing and decreasing said width of an arc gap.

References Cited in the file of this patent

UNITED STATES PATENTS

| | | |
|---|---|---|
| 2,047,984 | Riggs | July 12, 1936 |
| 2,671,843 | Steele | Mar. 9, 1954 |
| 2,788,463 | Kennedy | Apr. 9, 1957 |
| 2,875,368 | Jones et al. | Feb. 24, 1959 |